(No Model.)
A. W. KIRSCH-KING.
MACHINE JOINT.
No. 490,876.  Patented Jan. 31, 1893.
*FIG. 1*
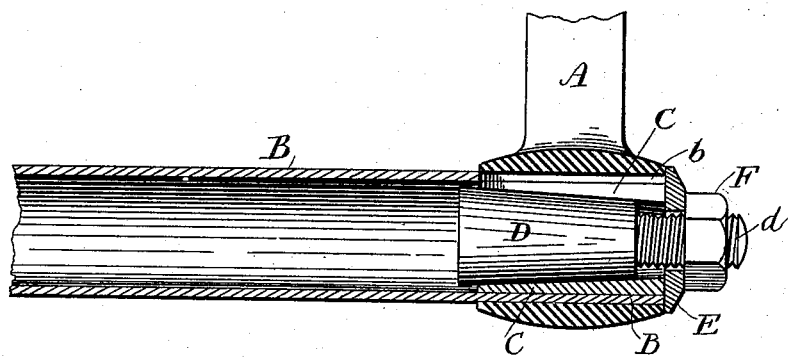
*FIG. 2.*  *FIG. 3.*
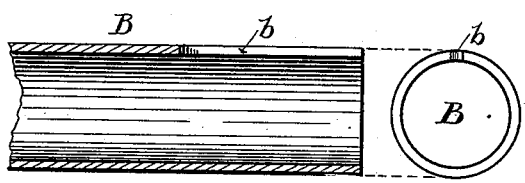 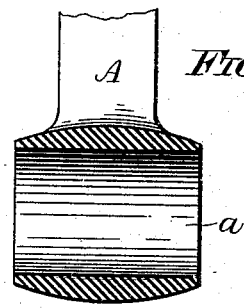
*FIG. 4.*
*FIG. 5*
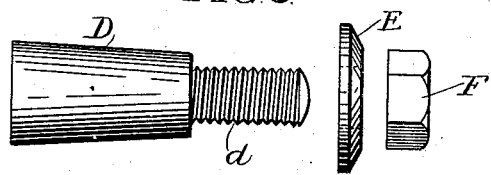
Witnesses:
J. Halpenny
Rundall W. Burns
Inventor:
Albert W. Kirsch-King
By his Attorneys
Gridley & Hopkins

UNITED STATES PATENT OFFICE.

ALBERT W. KIRSCH-KING, OF CHICAGO, ILLINOIS.

MACHINE-JOINT.

SPECIFICATION forming part of Letters Patent No. 490,876, dated January 31, 1893.

Application filed May 26, 1892. Serial No. 434,454. (No model.)

*To all whom it may concern:*

Be it known that I, ALBERT W. KIRSCH-KING, a citizen of the United States, residing at Chicago, in the county of Cook and State of Illinois, have invented certain new and useful Improvements in Joints for Uniting the Parts of Machines and other Structures, of which the following is a specification.

In constructing many machines it is necessary to secure a tube, rod, bar, or similar part to some other part, and among the many ways of securing such parts together, brazing and screwing are familiar and most frequently resorted to. If it is desired that the joint shall be permanent, and the parts not detachable, one of the parts is inserted in a socket in the other part, and the two are secured together by brazing; but if it is desired that the parts be detachably united, a screw-joint of one form or another is used. A brazed joint is preferable to a screw joint of customary construction because it is stronger and not apt to loosen with wear, but the brazed joint is more expensive and is sometimes objectionable because it does not permit the parts to be separated.

The object of the present invention is to provide a joint that combines the desirable features of these two old joints, i. e., the security of the brazed joint and the detachability and cheapness of the screw joint, and to this end the invention consists in certain features of novelty that are particularly pointed out in the claims.

In the accompanying drawings, which are made a part of this specification, Figure 1 is an axial section of one of the improved joints. Figs. 2 to 5 inclusive, are views showing the several parts thereof in detail.

A represents a part having a socket $a$, and B a second part which may or may not be hollow throughout its entire length, but must be hollow at the end that is to be joined to the part A. This end is of such size and shape that it snugly fits the socket $a$, and is preferably split as at $b$ for a purpose that will appear presently.

C is a bushing, the exterior of which is of such shape that it fits the interior of the part B, while its interior is slightly tapering. This bushing is split longitudinally, and within it fits a tapering plug D having a screw threaded extension $d$, which is adapted to receive a washer E and nut F.

In assembling the parts the small end of the plug is inserted in the large end of the bushing and the washer E and nut F are placed on the extension $e$ of the plug. The part B is then inserted in the socket from one end, and from the other end of said socket the expansible bushing is inserted in the hollow of the part B. Preferably the ends of the parts A, B and C are made flush with each other, and the washer E is of such diameter that it completely covers the ends of the parts B, C and D, and even bears upon the part A, but so far as effect in tightening the joint is concerned it is sufficient if the washer (or the nut, if the washer is omitted) is only large enough to bear upon the end of the bushing. The endwise movement of the nut with relation to the bushing being thus prevented the effect of turning the nut in one direction is to draw the tapering plug farther and farther into the tapering bore of the expansible bushing, and toward its smaller end. This expands the bushing, and the bushing in turn expands the end of the part B, and in this way the frictional contact between the exterior of the part B and the interior of the part A may be made so great that the two parts will be united as securely as if brazed.

If the part B is made of hardened steel, and is not split as shown in the drawings, there is danger that it will burst as it is expanded, and in this event the rupture might extend beyond the joint and along the part far enough to weaken it. By turning the nut in the opposite direction the parts may be separated.

As this joint is cheaper than a brazed joint and equally as secure, and as it at the same time enables the parts to be assembled and separated as readily as if secured together by a screw joint of common construction, it possesses the valuable features of both, and is therefore superior to either. It may be used for uniting the working parts of a machine, or the parts of the frame thereof, or the parts of structures of any and every description, it being especially useful for uniting the parts of such machines as bicycles, tricycles, and other machines. that require strength and neatness of finish.

What I claim as new and desire to secure by Letters Patent is—

1. The combination with a part having a socket, of a hollow expansible part fitting in said socket, an expansible bushing fitting in said hollow part, and means for expanding the bushing, substantially as set forth.

2. The combination with a part having a socket, of a hollow expansible part fitting in said socket, an expansible bushing fitting in said hollow part, a tapering plug fitting in said bushing, and means for holding said plug against endwise movement, substantially as set forth.

3. The combination with a part having a socket, of a hollow expansible part fitting in said socket, an expansible bushing, fitting in said hollow part and having a tapering bore, a tapering plug fitting in said bushing and having a screw threaded extension and a nut on said extension for drawing the plug into the bushing, substantially as set forth.

4. The combination with a part having a socket and a hollow expansible part fitting in said socket, of an expansible bushing fitting in said hollow part, and having a tapering bore, a tapering plug fitting in said bushing and having a screw theaded extension, a washer fitting on said extension and bearing against said bushing, and a nut on said stem engaging said washer, substantially as set forth.

5. The combination with the part A having a socket $a$, of the hollow part B, split as at $b$, the split bushing C fitting in said part B and having a tapering bore, the tapering plug D fitting in said bushing and means for forcing said plug into said bushing, substantially as set forth.

ALBERT W. KIRSCH-KING.

Witnesses:
N. C. GRIDLEY,
L. M. HOPKINS.